April 18, 1933.  E. MASSET  1,904,005
SAW GUARD
Filed Feb. 3, 1932
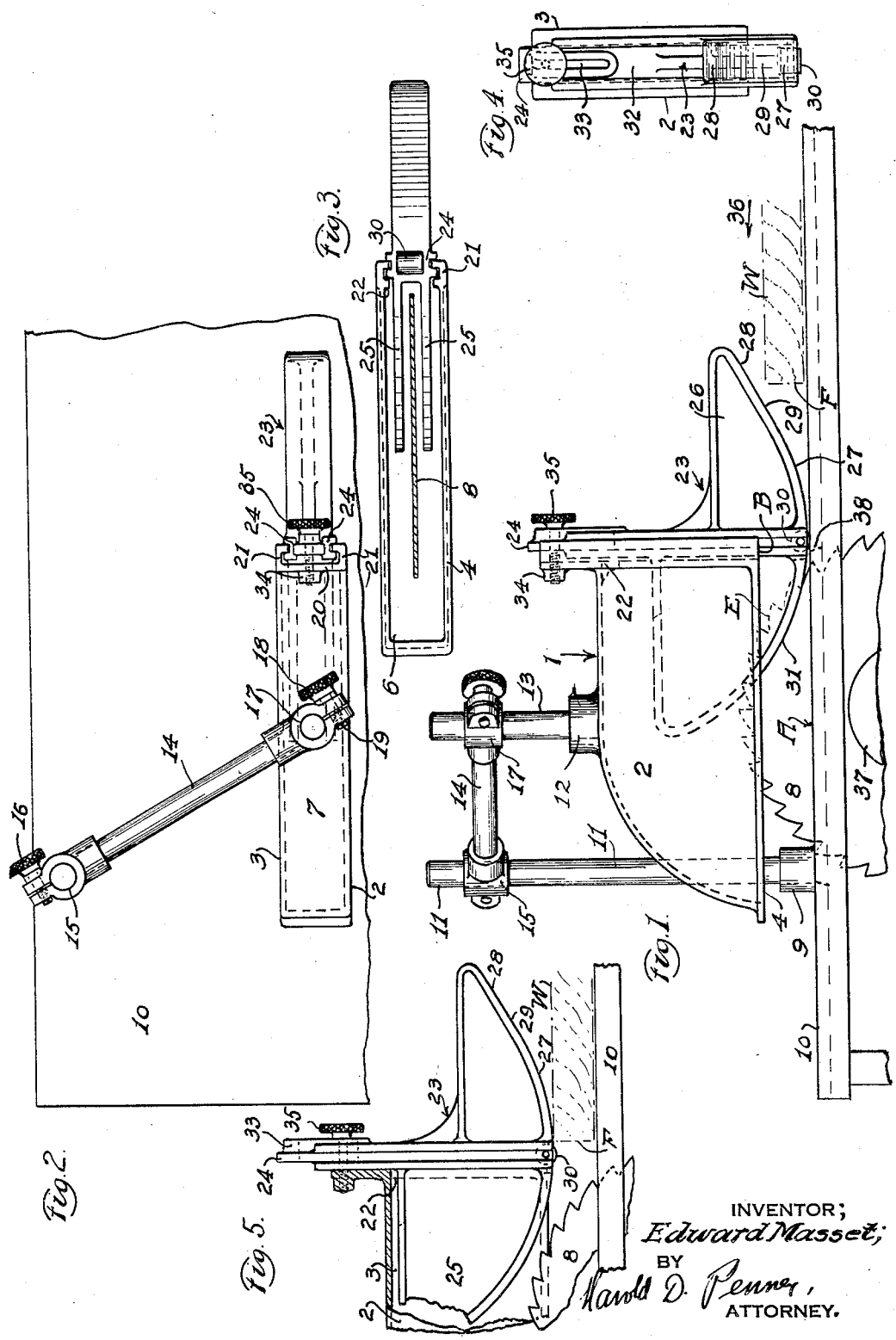
INVENTOR;
Edward Masset;
BY
Harold D. Penner,
ATTORNEY.

Patented Apr. 18, 1933

1,904,005

UNITED STATES PATENT OFFICE

EDWARD MASSET, OF NEW YORK, N. Y.

SAW GUARD

Application filed February 3, 1932. Serial No. 590,547.

My present invention relates to saw guards and has for one of its objects the provision of an organization in which the constituent elements are so coordinated structurally and functionally as to provide with simplified material a device which may be easily adjusted and kept in the working position to secure a greatly increased measure of safety for an operator.

As herein disclosed, the guard, which includes an adjustable fixed or main section, and a relatively movable section, is illustrated in connection with a saw of the rotary circular type, and since different pieces of stock or wood to cut by such saws frequently vary considerably in dimensions, another object of the invention is to render the fixed section adjustable and easily movable on certain occasions.

Pivotally movable saw guard sections have heretofore been proposed, but as these, owing to the limited nature of the pivot or bearing between the sections have not been completely satisfactory, particularly with work pieces of different sizes, a further object of this invention is the provision of an extended bearing, so that the force of the advancing material, as the latter strikes the movable section while being passed for cutting purposes towards the front edge of the saw blade, may be delivered uniformly to a relatively large area of the fixed section for securing improved results.

Connected with the foregoing, a feature of the invention is a vertical bearing, gibway or track, that is to say one perpendicular to the top or surface of the work table, in which about equal extended bearing areas are provided on the cooperating sections.

Another feature of the invention is an appropriate surface or contacting area for the work piece, on the movable section. This surface, including arcuate or curved portions, has a straight or flat interposed portion; and since it is immaterial, for the purpose of delivering equal force to the aforesaid bearing of the fixed section, what part of said interposed portion is struck by the advancing material to be cut, it follows that, within certain limits, any size of work piece may be fed to the apparatus, without adjustment thereof, and with the same economical and freely working result.

The improved guard, which is elongated in form, is disposed in fore and aft condition over the saw blade, and as it is frequently necessary to inspect, repair or change the blade, yet another object of the invention is the provision of a guard which may be completely moved or swung, preferably laterally, clear of the saw, to facilitate such inspection.

With the above indicated objects in view, and other which will hereinafter appear, the invention resides in a certain novel construction and arrangement of parts, the essential features of which are hereinafter clearly described, and fully illustrated in the accompanying drawing, in which:

Fig. 1 is a side elevational view showing my improved device in connection with the table of a saw, only as much of the latter being shown is sufficient for a complete understanding of the invention.

Fig. 2 is a top plan view, in which a fragment of the table is shown.

Fig. 3 is a bottom plan view, in which the saw blade is shown in section.

Fig. 4 is a front view.

Fig. 5 is a fragmentary, partly sectional, lateral view, in which the movable guard is elevated by the passage thereunder of a piece of wood to be cut by the saw.

Constructed preferably of suitable metal, my saw guard constitutes in its entirety a normally non-movable but adjustable housing section 1, having lateral walls 2, 3 of thin construction, which are open at the bottom 4, as shown in Fig. 1, to provide a hood like chamber 6, there being between said first walls a top wall 7, which is curved at its rear portion to conform generally with the shape of part of a circular saw 8.

Rising vertically from a base 9, which is fixedly mounted on the table 10, is a rigid post or support 11; and rising vertically from and in fixed relation with a boss 12, which is formed on or attached to the housing section 1, is a post or extension 13. An arm or bar 14 has at one of its ends a clamping bearing 15, the bifurcated terminals of which, as shown in Fig. 2, are adjustably held together by a screw 16 in embracing relation with said support 11.

The other end of the arm 14 is provided with a clamp bearing 17 and screw 18, which adjustably embrace the post 13. The housing section 1, with its mountings, hereinafter referred to, is therefore swingable pivotally with the arm 14 about the post 11, and to find its correct general position over the saw, irrespective of local adjustment, it is only necessary to position the center of the post 13 over the fore and aft central line of the saw. Then said housing is adjusted about the pivot or post 13, for longitudinal alignment with the saw, after which the screw 18 is tightened. Each of said screws is threadedly movable, as at 19, in one lug of its clamp.

Vertical movement of the housing section 1, with its mountings, is also secured with the last mentioned post 13, which is slidably movable through the clamp 17, for adjusting the space A below the bottom 4, on loosening the screw 18. These clamps and posts therefore permit of universal movement and adjustment of said housing, and although I have shown the adjustable supports 11, 13, it is obvious that other means could be used. The post 13 could, for instance, be movable through a clamp 17 carried directly on a ceiling, not shown.

The section 1 is provided with a forward gibway which includes, on opposite sides of a body portion 20, vertical bearings 21, between which and below the top wall 7, said section is open, this being at 22. See Fig. 5. In this section 1 is mounted a floating section 23, a gibway of which, including opposed vertical bearings 24, cooperates with said gibway 21.

The section 23 includes a pair of arms or walls 25 which, passing through said opening 22, find a housing in the chamber 6 and are movable therebelow to guard the saw edge E in said space A. Projecting forwardly from the bearings 24 is a portion 26 of said latter section. The respective base and top faces 27 and 28 of this portion or arm 26, which is hollow, are curved or arcuate, and between the curves is a straight or flat inclined face 29.

On feeding or moving a work piece, such as a piece of wood W, along the table 10, in the direction of the arrow, 36, to the saw, as indicated in Figs. 1 and 5, the leading end F engages or strikes said face 29, with the result that the floating section 23 is moved vertically upwardly. To facilitate movement between the work piece and the floating section, the latter is provided with a base recess, in which is journalled a roller 30. The work piece passes close to the bottom 4, and on moving beyond the edge E of the saw, after the cutting operation, the arcuate or inclined faces 31 of the walls 25 engage the rear end of said work piece, whereby to lower the section 23 automatically and gradually, by its own weight.

The central or body portion 32 of the gibway 24, which forms an extended bearing standard, is provided with a slot 33; and threadedly mounted in a hub 34 of the section 1 is a screw 35, the shank of which finds a loose bearing in said slot. This screw, cooperating with the slot, therefore determines the extent of the sliding movement of the floating section, as shown in Figs. 1 and 5.

A saw of any size, attached as to a mandrel 37, may be used, the one here shown being projected a predetermined distance through a slot 38 in the work table.

As the hereinbefore described construction admits of considerable modifications, without departing from the invention, the arrangements shown and described are to be taken as illustrative, and not in a limiting sense. Therefore, the scope of the protection contemplated is to be taken solely from the appended claims, interpreted as broadly as is consistent with the prior art.

What I claim is:

1. A saw guard for a work table comprising in combination a housing having a main section, said section having an open bottom to receive the top of a saw, means for supporting said housing to provide a space between said bottom and the table, a relatively movable section having rear spaced walls within said housing and extending therebelow for guarding the saw in said space, cooperating vertically disposed bearings integral with said sections, and an inclined surface extending forwardly from said second section in the path of a work piece, whereby the latter on being fed to the saw in said space may move said second section vertically.

2. A saw guard comprising in combination a housing having a main section, said section having lateral protecting walls, said housing being open at the bottom to receive the top of a saw, means supporting said housing, a second section movable relative to said first section, rear walls of said second section disposed between said first walls and extending therebelow for protecting part of the saw, and substantially vertical extended bearings disposed between said sections and integral therewith to facilitate the relative movement.

3. A saw guard comprising in combination a housing having a main section, said section having lateral protecting walls, said housing being open at the bottom to receive a saw, a front elongated vertical bearing on said housing, a movable section having a bearing disposed in cooperating relation with said first bearing, rear lateral arms carried by said second section between said walls and extending therebelow for guarding part of the saw, and a front inclined surface extending from said arms for engaging a work piece, whereby the latter on being moved to the saw may move said second section upwardly.

4. A saw guard comprising in combination a housing having a main section, said section having lateral protecting walls, said housing being open at the bottom to receive the top of a saw, a front elongated vertical bearing on said housing, a movable section having a bearing disposed in cooperating relation with said first bearing, rear lateral arms carried by said second section between said walls and extending therebelow for guarding part of the saw, a front inclined face extending from said arms for engaging a work piece, whereby the latter on being moved to the saw may move said second section vertically upwardly, and a roller carried by said latter section for engaging the work piece to facilitate its movement.

5. A saw guard for a work table comprising in combination a housing having a main section, said section having an open bottom disposed above and in spaced relation with the table for receiving the top of a saw, a support rising vertically from the table, an extension rising vertically from said section, an arm mounted on said support and attached to said extension, spaced transversely aligned front vertical bearing provided on said section, a vertically movable section having bearings disposed in cooperating relation with said first bearings, rear lateral walls extending from said second bearings into said housing and partly disposed therebelow for guarding the saw edge in said space, and a front inclined face extending from said second bearings for engaging the end of a work piece, whereby the latter on being moved to said edge may move said second section vertically.

6. A saw guard for a work table comprising in combination a housing having a main section, said section having an open bottom for receiving the top of a saw, means supporting said housing to provide a space between said bottom and the table, an elongated vertical bearing carried by said section, a movable section having a bearing disposed in cooperating relation with said first bearing, rear lateral arms carried by said latter section in said first section and extending therebelow for guarding the saw in said space, a front inclined surface extending from said arms for engaging a work piece, whereby the latter on being fed to the saw may move said second section vertically, and inclined faces on said arms for engaging the rear end of a work piece, whereby to lower said second section automatically on movement of the work piece past the saw.

7. A saw guard for a work table comprising in combination a housing having a main section, said section having an open bottom disposed above and in spaced relation with the table for receiving the top of a saw, a support mounted on the table and carrying said section, spaced transversely aligned front vertical bearings provided on said section, a vertically movable section having bearings disposed in cooperating relation with said first bearings, rear lateral walls extending from said second bearings into said housing and partly disposed therebelow for guarding the edge of the saw in said first space, a front inclined face extending from said second bearings for engaging the end of a work piece, whereby the latter on being moved to said edge may urge said second section vertically upwardly, and a roller carried by the base of said second section for engaging the work piece to facilitate its movement.

8. In a saw guard comprising a housing having a main section, said section having vertically disposed bearings, a second section movable relative to said first section and having bearings cooperating with said first bearings, a front arm projecting from said second section and including a base arcuate face portion, a top arcuate face portion, and a straight inclined face disposed between said portions, whereby work pieces of different height on being moved to the saw may engage said straight face to urge said second section vertically upwardly.

9. In a saw guard comprising a housing having a main section, said section having vertically disposed bearings, a second section movable relative to said first section and having bearings cooperating with said first bearings, a front extension projecting said second section and including a base arcuate face portion, and a straight inclined face disposed above said portion, whereby a work piece on being moved to the saw and engaging part of said face may urge said second section vertically upwardly.

10. A saw guard including in combination with a support, a housing comprising a main section carried by said support and having opposed walls, vertical bearings integral with said walls, a movable section having integral bearings for cooperation with the first mentioned bearings, and an inclined face on said movable section for engaging a work piece, whereby the latter on being moved to the saw may urge said movable section vertically upward.

11. In combination with a support, a saw guard including a housing comprising a main section having opposed walls, said walls providing elongate vertical bearings, a movable section having opposed walls between the first mentioned walls, bearings integral with the last mentioned walls and cooperating with the first mentioned bearings, and an inclined face projecting from said movable section for engaging a work piece, whereby the latter on being moved to the saw may urge said movable section substantially vertically upward.

12. In combination with a support, a saw guard comprising a housing having a main section and including opposed side walls, elongate front bearings integral with said walls, the latter being open at the front, a movable section having opposed walls between the first mentioned walls, a vertical bearing integral with the second mentioned walls and cooperating with the first mentioned bearings to close the open front, and an inclined face projecting from said movable section for engaging a work piece, whereby the latter on being moved to the saw may urge said movable section vertically upward.

13. A saw guard including in combination with a work table, and a support carried thereby, a housing carried by said support and including a main section having spaced walls, vertical bearings integral with said walls, a movable section having spaced walls disposed between the first walls for guarding a saw blade, bearings integral with the last mentioned walls and cooperating with the first mentioned bearings, and an inclined arm carried by said movable section for engaging a work piece, whereby the latter on being moved to the saw may urge said movable section vertically upward.

14. In combination with a support, a saw guard including a housing comprising a main section having opposed walls, vertical bearings integral with said walls, a movable adjustable section having spaced walls disposed between the first mentioned walls for guarding a saw, and means for holding said main section rigid with the second mentioned section subsequent to adjustment of the latter.

15. In a saw guard, a housing including a section having a rear arcuate wall, side walls open at the bottom for receiving a saw blade and having an open front, vertical bearings integral with said walls at the front, and a relatively movable section having bearings cooperating with the first mentioned bearings and closing the first mentioned section at its front.

16. In a saw guard, in combination, a housing including a main portion having a rear arcuate wall, side walls open at the bottom for receiving a saw blade, vertically disposed front bearings integral with said walls, a movable section having bearings cooperating with the first mentioned bearings, inner walls extending rearwardly from the last mentioned bearings and movable below said side walls for guarding the saw blade, a front arm also projecting from the last mentioned bearings, and inclined lower surfaces on said arm and said inner walls, whereby to cause vertical upward and downward movement of said section responsive to movement of a work piece to and from said blade.

17. In a saw guard, the combination with a housing comprising a fixed section, and a movable section having a front inclined arm, of substantially vertically disposed inwardly facing channel bearings integral with said fixed section, and opposed outwardly facing channel bearings integral with said movable section and slidably embracing the first mentioned bearings, whereby as a work piece engages said arm on being moved to the saw, said movable section may be urged vertically upwardly.

18. In a saw guard, the combination of a housing comprising a fixed section having an open bottom for receiving a saw blade, said section including spaced walls and being open at the front, vertically disposed inwardly facing channel bearing carried by said walls at said open front, a movable section having also an open bottom and cooperating with the first mentioned section, said movable section being open at the rear and having spaced walls disposed between the first mentioned walls, the walls of said movable section having each a bottom inclined face, an arm extending forwardly from said movable section and having also an inclined bottom face, and outwardly facing channel bearings carried by the second mentioned section and slidably embracing the first mentioned bearings, whereby as a work piece is moved to and from said blade the front and rear ends of said work piece may engage said respective faces to urge said movable section vertically upwardly and downwardly.

19. A saw guard including in combination a housing having a fixed section, said section having an open front, parallel vertical guiding surfaces disposed at said front, and a movable section including a substantially vertically disposed standard, said standard having guiding surfaces slidably engaging the first mentioned surfaces.

20. In combination with a support, a sawguard carried by said support and including a main section having an open bottom to receive a saw blade, said section including an open front and having vertical guiding surfaces parallel thereto, a movable section having an open bottom cooperating with the bottom of the first mentioned section, and a vertical standard rigid with said movable section and having guiding surfaces slidably disposed between the first mentioned surfaces.

21. A saw guard including in combination a housing comprising a main section having an open bottom for receiving a saw blade, said section including spaced walls and being open at the front, parallel vertical guiding surfaces provided on said walls at said front, a movable section having an open bottom cooperating with the bottom of the first mentioned section, said movable section being open at the rear and having spaced walls disposed between the first mentioned walls, and a vertically disposed standard rigid with said movable section and having guiding surfaces slidably disposed between the first mentioned surfaces.

22. In a saw guard, a housing comprising a section having substantially vertically disposed guiding surfaces extending completely from the top to the bottom thereof, and a movable section including a vertically disposed elongated standard having guiding surfaces slidably engaging the first mentioned surfaces.

Signed at New York in the county of Kings and State of New York this 1 day of February A. D. 1932.

EDWARD MASSET.